United States Patent [19]
Foley et al.

[11] Patent Number: 5,500,914
[45] Date of Patent: Mar. 19, 1996

[54] OPTICAL INTERCONNECT UNIT AND METHOD OR MAKING

[75] Inventors: Barbara M. Foley, Phoenix; David Galloway, Tempe; Shun-Meen Kuo, Chandler; Christopher K. Y. Chun, Gilbert, all of Ariz.

[73] Assignee: Motorola, Schaumburg, Ill.

[21] Appl. No.: 237,524

[22] Filed: May 3, 1994

[51] Int. Cl.⁶ .................................................... G02B 6/36
[52] U.S. Cl. .................. 385/77; 385/31; 385/58; 385/70
[58] Field of Search ................. 385/77, 31, 58, 385/70, 76, 129, 137, 83, 80, 56; 257/433, 458, 698, 724

[56] References Cited

U.S. PATENT DOCUMENTS

| | | | |
|---|---|---|---|
| 4,291,943 | 9/1981 | Binek et al. | 385/56 |
| 5,166,993 | 11/1992 | Blyer, Jr. et al. | 385/31 |
| 5,170,448 | 12/1992 | Ackley et al. | 385/31 |
| 5,313,545 | 5/1994 | Kuo et al. | 385/129 |

OTHER PUBLICATIONS

A. H. Cherin et al., Molded Plastic Connector for Splicing Optical Cable, The Bell System Technical Journal, Oct. 1976, pp. 1057–1067.

M. E. Robertsson et al., Plastic Optical Connectors Molded Directly onto Optical Fibers and Optical Fiber Ribbons, Institute of Electrical and Electronics Engineer, Mar. 3, 1993, pp. 498–504.

Primary Examiner—John D. Lee
Assistant Examiner—Phan T. H. Palmer
Attorney, Agent, or Firm—Gary F. Witting; Eugene A. Parsons

[57] ABSTRACT

A method for making an optical interconnect unit is disclosed. A mold (100) with surface (107) having a groove (112) is formed. An optical fiber (117) is placed into the groove (112) of the surface (107). A molding material is applied onto the surface (107) of the mold (100) and onto the optical fiber (117), thereby affixing the optical fiber (117) to the molding material.

18 Claims, 4 Drawing Sheets

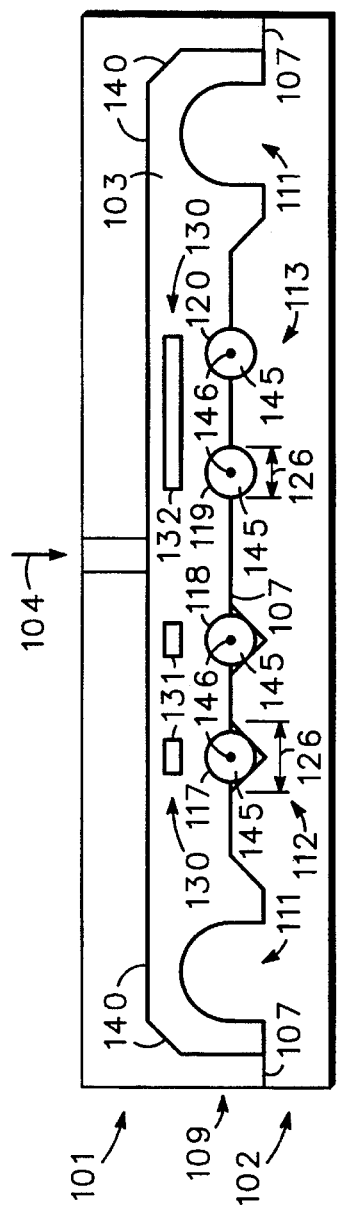
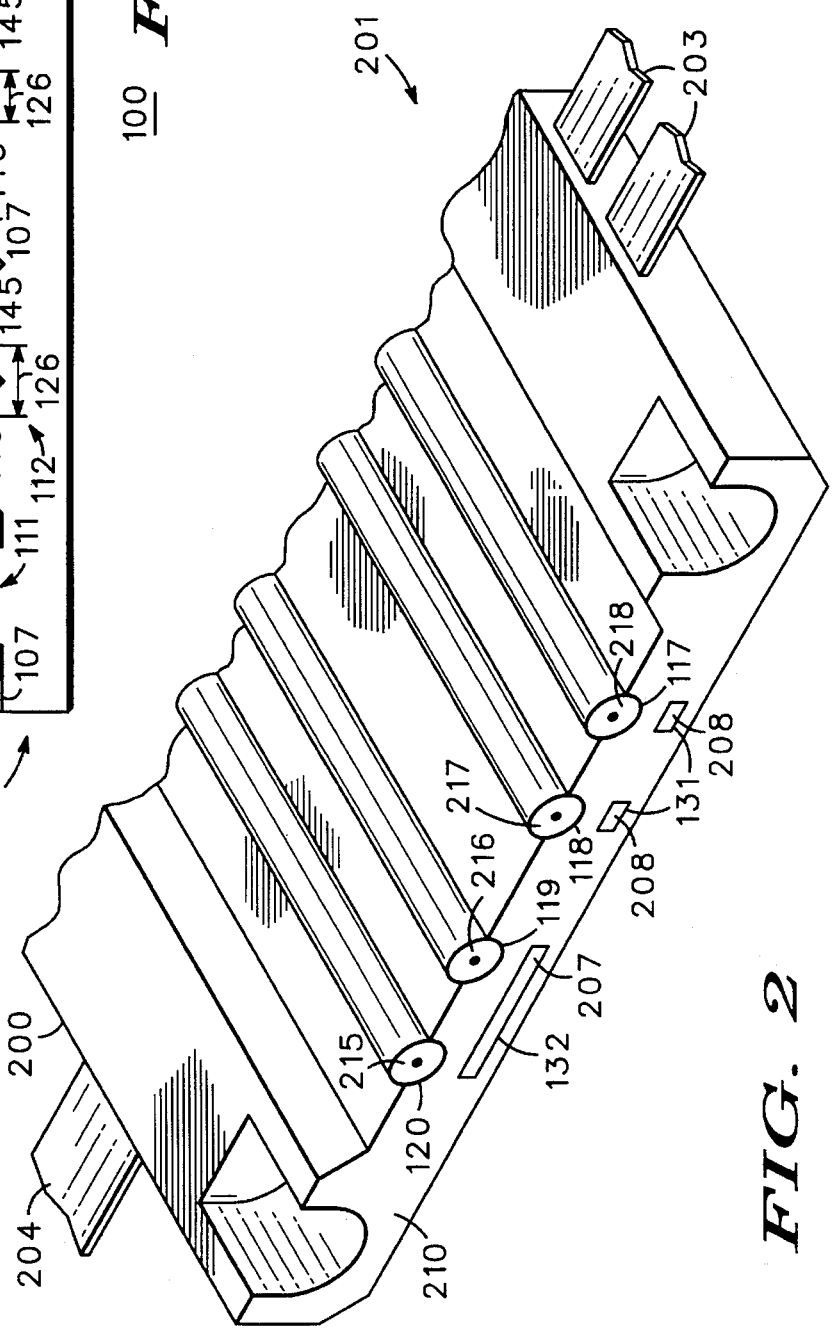
FIG. 1
FIG. 2

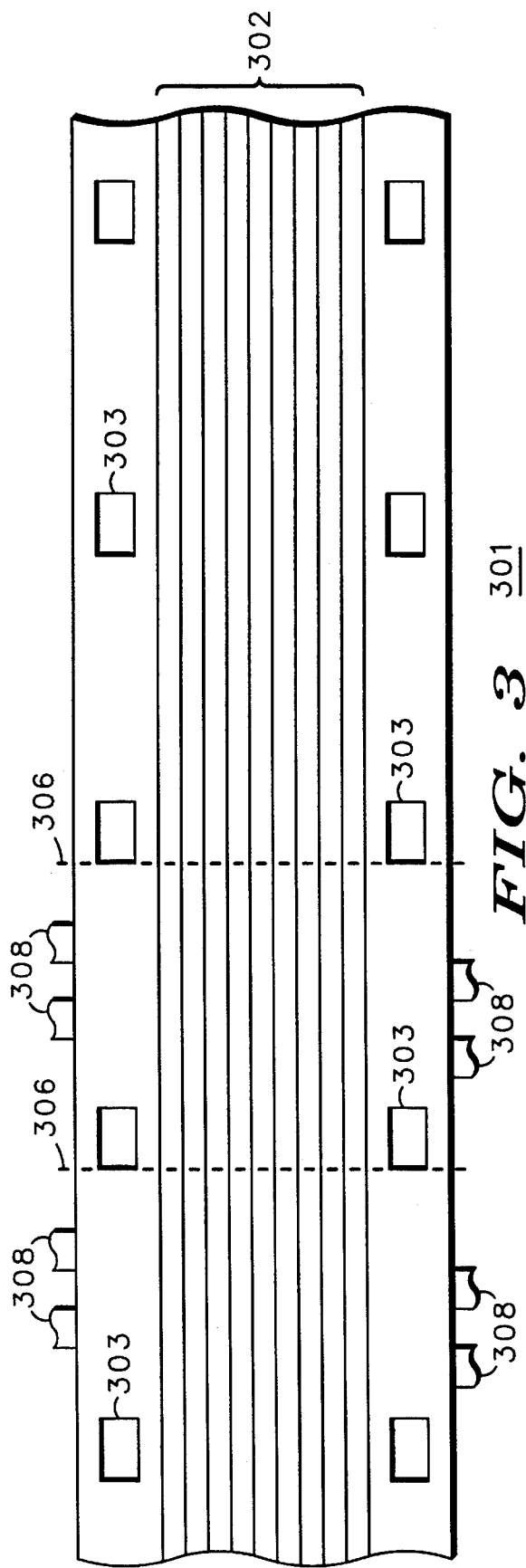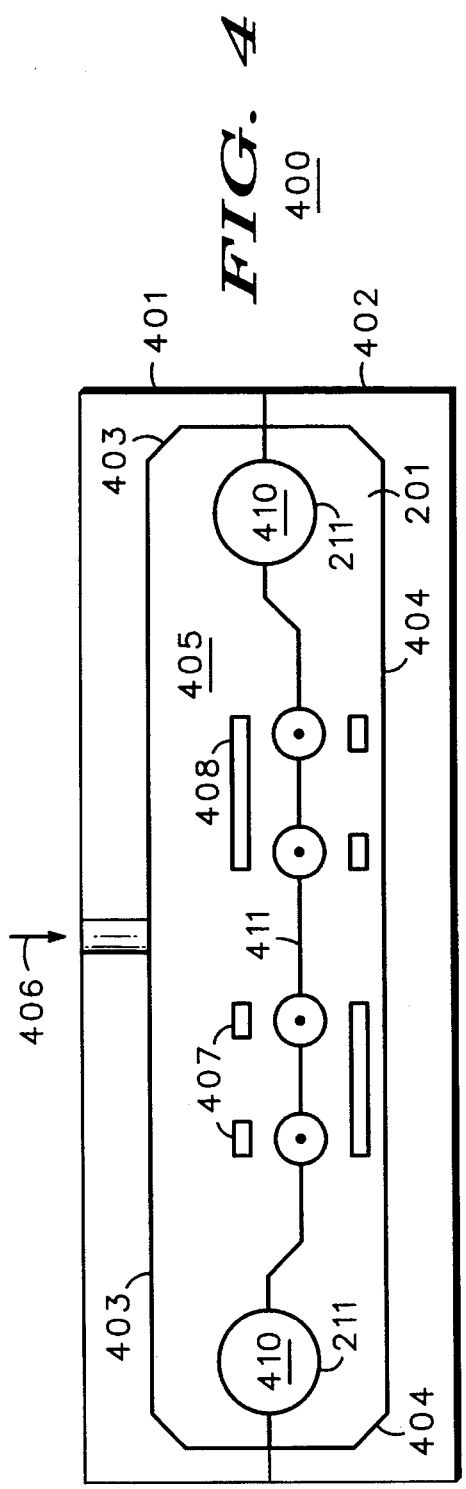

500

600

OPTICAL INTERCONNECT UNIT AND METHOD OR MAKING

BACKGROUND OF THE INVENTION

This invention relates, in general, to optoelectronic devices and, in particular, to optical interconnect units.

At present, optical fibers are used to transmit optical signals across long distances and typically are not used to transmit light signals short distances or in close association with standard electrical components. However, while waveguides are used to transmit optical signals short distances, waveguides typically are expensive and difficult to make.

Generally, fabrication of optical waveguides is achieved by either a polymer spin-on technique or a diffusion technique, both of which require expensive photolithography steps. Additionally, both fabrication techniques are ineffective and inefficient for fabricating optical waveguides in high volumes for several reasons, such as complex processing steps, difficulties in controlling the processing steps, and high cost.

As practiced by one method in the prior art, a polymeric film is spun onto a substrate. Portions of the polymeric film are subsequently exposed to light by a photolithographic process, thereby changing the refractive index of the polymeric film and creating a waveguide in the polymeric film. However, subsequent multistep processing, such as removal of the polymeric film from the substrate, lamination processing, curing, and other processes typically are required for the waveguide to be useful. Further, it should be noted that each additional processing step incurs an additional cost, as well as presenting an opportunity to induce defects into the waveguide.

Alternatively, in another method practiced in the prior art, a layer such as a glass is applied to a substrate. The layer is patterned by a complicated photolithography process, thereby producing portions that are masked and portions that are open or clear. Typically, ions are subsequently diffused into the open portions of the layer, thus changing the refractive index of the layer and making a waveguide. However, using a photolithography process results in a high cost of manufacturing. Also, by using diffusion processes to change the refractive index of the layer, control of dimensionality of the waveguide is severely limited.

It can be readily seen that conventional methods for making waveguides have serious limitations. Also, it is evident that the conventional processing uses a multitude of steps, which are not only complex and expensive, but also not effective processing. Therefore, a method for making an optical interconnect unit that provides a reduction in the number of steps, simplifies the process, reduces cost, would be highly desirable.

SUMMARY OF THE INVENTION

Briefly stated, a method for making an optical interconnect unit is disclosed. A mold with a surface having a groove is formed. An optical fiber is placed into the groove of the surface. A molding material is applied onto the surface of the mold having the optical fiber, thereby affixing the optical fiber to the molding material.

BRIEF DESCRIPTION OF THE DRAWINGS

FIG. 1 is a simplified cross-sectional view of a mold;

FIG. 2 is a simplified cross-sectional view of optical fiber affixed to a molded first portion;

FIG. 3 is a simplified plan view of a plurality of molded first portions;

FIG. 4 is a simplified cross-sectional view of another mold;

DETAILED DESCRIPTION OF THE DRAWINGS

Figure 5:
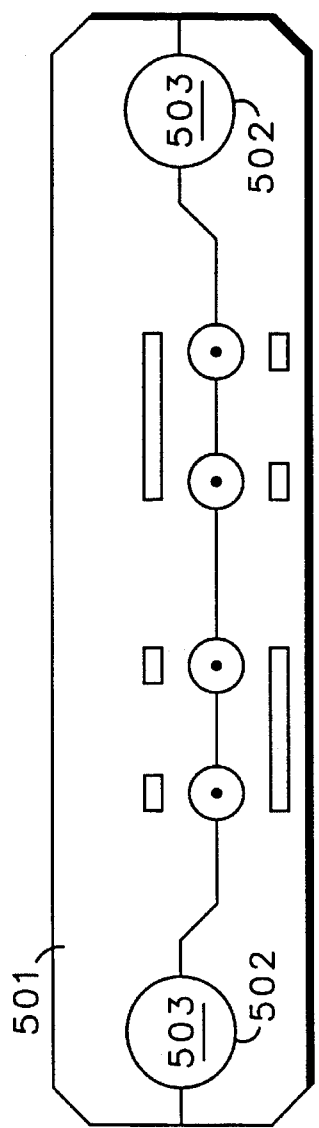
FIG. 5 is a simplified cross-sectional view of an optical interconnect unit.

FIG. 1 is a simplified cross-sectional view of a mold 100 used for making a molded first portion 200 as shown in FIG. 2. It should be understood that mold 100 has been greatly simplified and that only a brief description of mold 100 is necessary for a clear understanding of the present invention. Typically, mold 100 is made of a top portion 101 and a bottom portion 102 defining a cavity therebetween. Top and bottom portions 101 and 102, respectively, are made of any suitable material, such as metals, (e.g., stainless steel, aluminum), ceramics, and the like. Further, top and bottom portions 101 and 102 typically are configured so as to provide appropriate heating and cooling capabilities, as well as providing necessary pressure capabilities that are dictated by the selection of the molding materials or molding compounds.

A surface 107 of bottom portion 102 is formed as a negative relief pattern having features 109. A surface 140 of top portion 101 is formed as a negative relief pattern. Features 109 on surface 107 are made in any suitable shape and size, such as V-grooves, semicircles, U-grooves, rectangular grooves, with sizes having a minimum feature size of 0.5 micron or the like. Additionally, since FIG. 1 is a cross-sectional view, it should be understood that features 109 and surface 107 can extend into and out of the drawing, thus allowing features 109 to be varied, such as bending and curving. Also, widths 126 of features 109 are capable of being adjusted to specific design requirements.

Referring now to features 111, features 111 are shaped so as to provide an alignment guide. As illustrated in FIG. 1, features 111 are shaped as a semicircle, thereby providing a negative relief pattern that will be translated into a positive pattern. However, it should be understood that features 111 can be formed in other shapes. Use of features 111 typically are for alignment guides; however, alignment guides, as shown in FIG. 1, do not necessarily have to be used. For example, an outer contour of a molded object may be used to provide alignment.

Features 112 and 113 illustrate two different shapes for supporting optical fibers 117–120. Features 112 are shaped as V-grooves so as to support optical fibers 117 and 118. Use of V-grooves in surface 107 allows a variety of sizes of optical fibers to be positioned in the V-grooves. Features 113 are shaped as semicircles so as to support optical fibers 119 and 120. Use of semicircles in surface 107 provides a snug fit for supporting optical fibers 119 and 120.

Optical fibers 117–120 are made of a cladding region 145 that surrounds core region 146. Generally, refractive indexes of optical fibers 117–120 range from 1.3 to 1.7; however, the refractive index of core region 146 is at least 0.01 higher than that of cladding region 145, thus enabling efficient and effective guiding of light through optical fibers 117–120.

A plurality of conductive members 130 are illustrated in FIG. 1 as sections. Generally, the plurality of conductive members 130 are segregated into at least two groups, i.e., signal contacts or electrical contacts 131 and a ground plane member or ground contact 132. It should be understood that while it is possible to have both electrical contacts 131 and ground plane contact 132 positioned on the same side of optical fibers 117–120, it is typically not engineered in this manner. Nominally, electrical contacts 131 are provided adjacent to and on one side of optical fibers 117–120 with ground plane member 132 positioned adjacent to and on the other side of optical fiber 117–120. Electrical contacts 131 and ground plane contact 132 are, for example, provided in the form of a flexible leadframe, which is well known in the semiconductor art. Ground contact 132 and electrical contacts 131 are formed of any convenient electrically conducting material, such as copper, aluminum, gold, silver, etc.

Generally, top portion 101 and bottom portion 102 of mold 100 are securely held together, with the appropriate process conditions selected for the specific molding compound or molding material. The molding material, represented by arrow 104, is injected into cavity 103.

By way of example, top portion 101 and bottom portion 102 are opened, thereby exposing surface 107 of bottom portion 102. Using features 112 as an example, optical fibers 117 and 118 are positioned into features 112. Top portion 101 and bottom portion 102 of mold 100 are then closed and held securely together. Any suitable molding material or molding compound is used, such as epoxies, plastics, polyimides, or the like. Once the appropriate molding material is selected, process conditions for that specific molding material are selected. The selected molding material is injected into closed mold 100. Generally, processing conditions for these molding materials range from 22 to 200 degrees Celsius for molding temperatures and 200 to 2,000 pounds per square inch for molding pressures. By injecting the molding material, represented by arrow 104, into cavity 103, intricacies of surfaces 107 and 140 of lower portion 102 and upper portion 101 are transferred to the molding compound. A subsequent curing process solidifies the molding compound, thereby permanently transferring the intricacies or a negative image of surfaces 107 and 140 to the solidified molding compound in cavity 103.

Once the curing processes are completed, mold 100 is opened, and a molded first portion 201, as shown in FIG. 2, is removed from mold 100.

FIG. 2 is a simplified perspective view of molded first portion 201 having optical fibers 117–120 affixed therewith, and further illustrating, in particular, a sectional view of molded first portion 201. It should be understood that features with an identifying numeral in FIG. 1 will retain their original identifying numerals. It should be further understood that molded first portions 201 can be molded either as a single unit or can be molded as a plurality of units 301 as illustrated in FIG. 3. Further, molded first potion 201 provides an optical face 210 with optical faces 215–218 of optical fibers 117–120 that are mated with photonic devices (shown in FIG. 7) or other optical fibers (not shown) that are discussed hereinbelow. It should be understood that mating of optical faces 215–218 to the photonic devices couples light from the photonic devices to optical fiber 117–120.

As can be seen in FIG. 2, electrical contacts 131 and ground contact 132 are formed in molded first portion 200 with each having a first end forming electrically accessible contacts 208 and 207, respectively. Electrical contacts 131 and ground contact 132 extend into the molding material and are bent so as to exit the molding material as leads 203 and 204, respectively, which are shown in part and are available for external electrical connections thereto.

FIG. 3 is a simplified plan view of a plurality of molded first portions 301. As can be seen, a plurality of optical fibers 302 are affixed in the molding material or compound of the plurality of molded first portions 301. Additionally, a plurality of features 303 similar in shape to features 111 are molded into the plurality of molded first portions 301. The plurality of features 303 serves as alignment guides for a variety of processes. For example, the plurality of features 303 serves as a demarcation where the plurality of molded first portions 301 are to be cleaved or cut, indicated by dotted lines 306, thereby generating individual molded first portions. Further, leadframe members 308 are seen extending from the plurality of molded first portions 301, thereby enabling electrical connection to be made to electrical contacts 131 and ground contact 132 discussed hereinabove.

FIG. 4 is a simplified illustration of a cross-sectional view of another mold 400 used for making a molded second portion 501 affixed to molded first portion 201 as shown in FIG. 5. It should be understood that either molded first portion 201 or the plurality of molded first portions 301 as shown in FIGS. 2 and 3, respectively can be processed in accordance with the teaching of FIG. 4. It should be further understood that the plurality of molded first portions 301 can be broken, cleaved, or cut at appropriate locations as described hereinbefore, thereby yielding individual molded first portions. Typically, mold 400 is made of an upper portion 401 having surface 403 and a lower portion 402 having surface 404 and defining a cavity 405 therebetween.

As described with reference to FIG. 1 regarding mold 100, mold 400 is opened, and either molded first portion 201 or the plurality of molded first portions 300 are placed on surface 404 of lower portion 402 of mold 400. Appropriate electrically conductive members, illustrated by contacts 407 and a ground plane 408 are positioned in cavity 405. Additionally, features or alignment guides 211 are fitted with a slug 410 made of nonadhering material, such as glass, metal, or the like. By selecting different shapes for slug 410, a variety of shapes are obtainable with the injection of the molding material into cavity 405 so that features 211 are not filled by subsequent injection of molding material into cavity 405. Additionally, upper portion 401 and lower portion 402 are closed and brought to appropriate processing conditions. The molding material is injected into cavity 405, represented by arrow 406, thus filling cavity 405. By filling cavity 405 with the molding compound, surface 403 of upper portion 401 of mold 400 and surface 411 of molded first portion 201 are replicated by the molding compound. Also, as previously describe with reference to FIG. 1, the molding compound is cured, solidified, and subsequently removed from mold 400, thereby providing a molded second portion 501 as shown in FIG. 5.

Once the curing processes are completed, mold 400 is opened and a molded second portion 501 and molded first portion 201, as shown in FIG. 5, are removed from mold 400.

FIG. 5 is a simplified cross-sectional view of an optical interconnect unit 500 formed as with reference to FIGS. 1–4. Alignment guides 502 are shown with slugs 410 removed, thus providing a cavity 503 that allows an alignment pin (not shown) to be placed into cavity 503.

Figure 6:
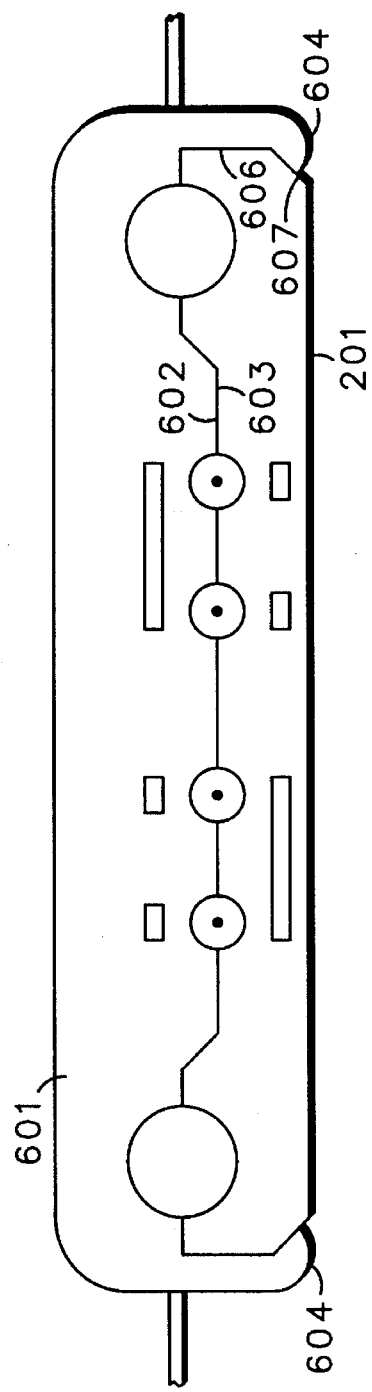
FIG. 6 is a simplified cross-sectional view of another optical interconnect unit.

FIG. 6 is a simplified cross-sectional view of a molded optical interconnect 600 with molded first portion 201 and a second portion 601 being formed by any suitable process, such as molding, milling, laser ablating, milling, combination thereof, or the like. However, in a preferred embodiment of the present invention second portion 601 is formed by molding. Generally, second portion 601 is formed so that surface 602 of second portion 601 and surface 603 of molded first portion 201 fit snugly together. Additionally, second portion 601 is formed having grasping apparatus 604 that is detachablely affixed along a portion of a surface 606 of molded first portion 201. Additionally, it should be understood that portions of grasping apparatus 604 can extend beyond surface 606 and onto a surface 607 for making a more secure fit. Further, to permanently secure second portion 601 to molded first portion 201, second portion 601 is attached or affixed to molded first portion 201 by any suitable adhesive, such as epoxies, polyimides, and the like.

Figure 7:
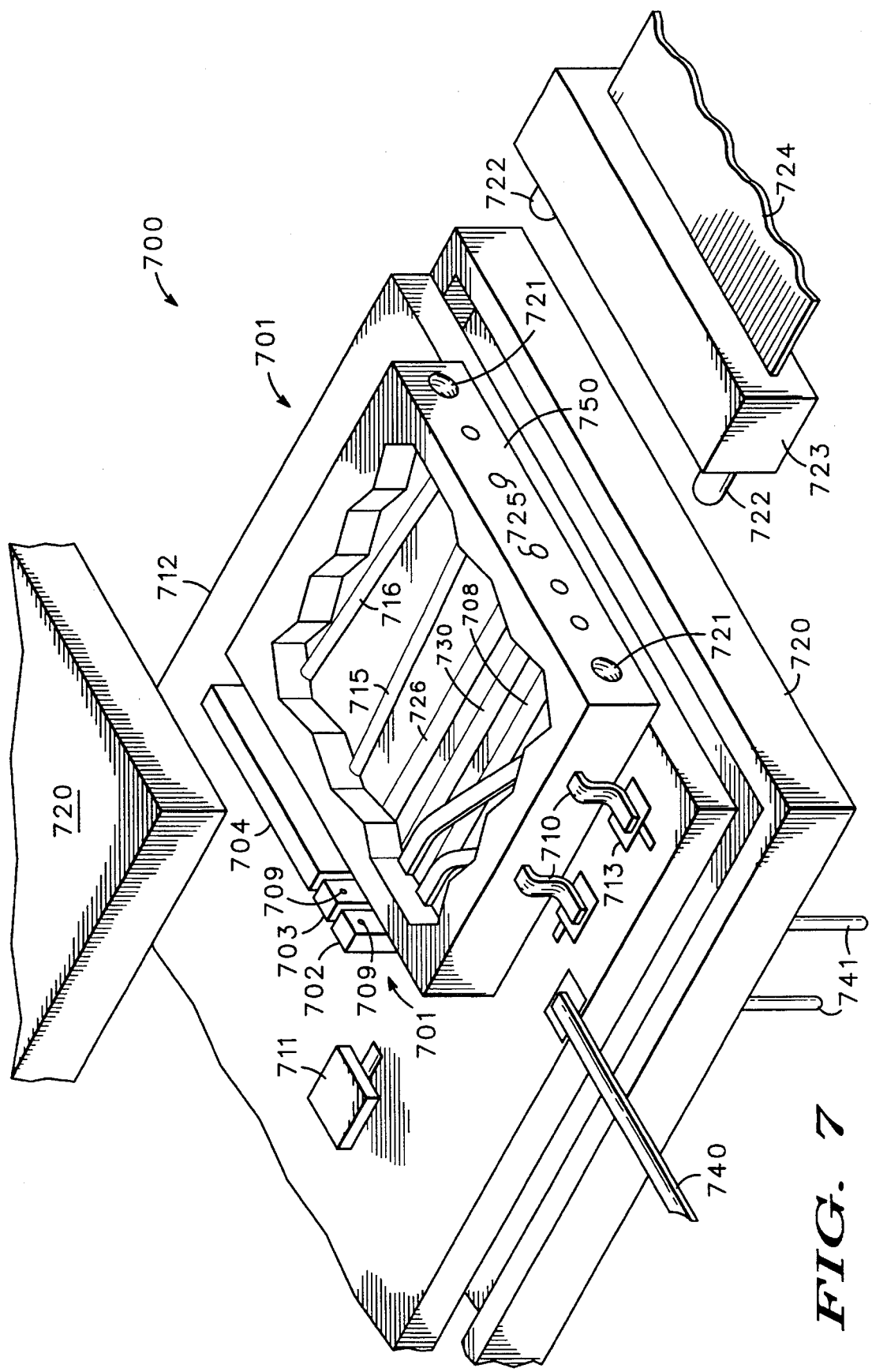
FIG. 7 is a partially exploded simplified pictorial view of an optical electronic module, with portions thereof removed.

FIG. 7 is a simplified partially exploded pictorial view of an optical electronic module 700. In the present invention, molded optical interconnect unit 701 is electrically coupled to standard electronic components.

Typically, molded optical interconnect unit 701 is fitted with any suitable photonic device or optical component, such as a phototransmitter or laser 702, a photodetector or photodiode 703, or a combination of both lasers and photodetectors. Alternatively, an array 704 is mounted on molded optical interconnect unit 701 having a variety of photonic devices or optical components. The optical components are mounted on molded optical interconnect unit 701 in such a manner that individual working portions of the optical components are aligned to a core region of an optical fiber 708, discussed hereinbefore, thus providing maximum light transmission through core region of optical fiber 708. For example, laser 702 is mounted by any suitable electrical contact method, such as conductive bumps, solder bumps, conductive bumps, or the like on contacts and ground plane (not shown), respectively, indicated by contacts 709. By accurately mounting laser 702 with contact 709, laser 702 is mounted on molded optical interconnect unit 701. Light transmission from the working portions of laser 702 directed through the core region of optical fiber 708 is maximized.

Further, as is shown in FIG. 7, optical fibers 715 and 716 do not travel in parallel lines, but travel in diverging lines, thereby enabling coupling through optical fibers 715 and 716 which are asymmetric or not parallel to each other.

Generally, molded optical interconnect unit 701 with attached optical components is electrically and mechanically mounted to interconnect substrate 712. Interconnect substrate 712 is made of any suitable interconnect substrate, such as a printed circuit board, FR4 board, silicon interconnect substrate, or the like. Several methods may be used for attaching interconnect substrate 712 to molded optical interconnect unit 701, such as cementing, press fitting, molding, or the like. In one embodiment of the present invention, an epoxy adhesive is applied to interconnect substrate 712 at an approximate location where molded optical interconnect unit 701 and interconnect substrate 712 are to be bonded. In another embodiment of the present invention, leadframe members 710 provide both an electrical and a mechanical mounting system for molded optical interconnect unit 701. Molded optical interconnect unit 701 in either mounting procedure is placed onto interconnect substrate 712 by an automated system such as a robot arm, thereby providing accurate placement and orientation of molded optical interconnect unit 701.

Subsequent electrical coupling of standard electrical components, as illustrated by an integrated circuit 711, on interconnect substrate 712 to the optical components is achieved by any suitable method, such as TAB, solder bump, or the like. For example, leadframe members 710 are electrically and mechanically coupled with a solder bump. It should be evident by one skilled in the art that many more electrical couplings typically are necessary to fully utilize inputs and outputs of both the standard electrical components and the optical components. It should be further evident that standard output and input means, represented by lead 713, are used to couple other components as well.

Further, plastic encapsulation of interconnect substrate 712 and molded optical interconnect unit 701 typically is achieved by an overmolding process, represented by plastic pieces 720, which encapsulates interconnect substrate 712 and molded optical interconnect unit 701, while leaving alignment ferrules 721 and end 750 open and clear of debris. Alignment ferrules 721 are then engaged by alignment pins 722 of optical connector 723 having optical cable 724, thereby providing accurate and repeatable alignment of surfaces 725 of optical fibers 708, 730, 726, 715, and 716 to optical fiber ribbon 724.

Electrical connection from optical electronic module 700 to other electronic equipment or components is achieved by any suitable method, such as leadframe member 740, pin grid array pins 741, or the like.

By now it should be appreciated that a novel method for making a molded optical interconnect unit and an optical electrical module has been described. The method allows for the making of molded optical interconnect units cost effective. Additionally, this method allows for an inexpensive process of combining both standard electrical components and optical components.

We claim:

1. A method for making an optical interconnect unit comprising the steps of:

forming a mold with a surface, the surface having a groove extended thereon;

placing an optical fiber having a cladding region and a core region in the groove of the surface;

positioning an electrically conductive member adjacent to the optical fiber;

applying a material onto the surface, the electrically conductive member, and the optical fiber, thereby affixing the optical fiber and the electrically conductive member adjacently with the material; and cleaving the affixed optical fiber in the material, thereby exposing a portion of the core region and the cladding region of the optical fiber.

2. A method for making an optical interconnect unit as claimed in claim 1 wherein the step of applying a material, the material is a molding compound.

3. A method for making an optical interconnect unit as claimed in claim 1 wherein the step of applying a material, the material is selected from a group comprising: polyimides, polymers, and epoxies.

4. A method for making an optical interconnect unit as claimed in claim 1 wherein the step of applying a material onto both the surface and the optical fiber includes forming an alignment guide.

5. A method for making an optical interconnect unit as claimed in claim 1 wherein the step of positioning the conductive member, the electrically conductive member is a lead frame.

6. A molded optical interconnect unit comprising:

a first molded portion having a plurality of optical fibers attached thereto;

a first plurality of electrically conductive members molded and positioned in the first molded portion so that a portion from one of the plurality of optical fibers and a portion from one of the first plurality of electrically conductive members are parallel and adjacent in position; and a second molded portion with a second plurality of electrically conductive members positioned so that the second plurality of electrically conductive members align adjacent on another side of the plurality of optical fibers.

7. A method for making an optical interconnect unit comprising the steps of:

forming a first mold portion having a surface, the surface having a plurality of grooves on the surface;

placing at least one of a plurality of optical fibers in at least one of the plurality of grooves on the surface of the first mold portion;

positioning an electrically conductive member adjacent to the at least one of the plurality of optical fibers;

mating a second mold portion with the first mold portion forming a cavity between the surface of the first mold portion and the second mold portion, the cavity enclosing at least a portion of the at least one of the plurality of optical fibers placed in the plurality of grooves on the first mold portion; and injecting a material into the cavity so as to bind the material to the at least a portion of the at least one of the plurality of optical fibers.

8. A method for making an optical interconnect unit as claimed in claim 7 wherein the step of forming the plurality of grooves, the plurality of grooves is formed substantially parallel.

9. A method for making an optical interconnect unit as claimed in claim 7 wherein the step of forming the plurality of grooves, the plurality of grooves is formed asymmetrically spaced.

10. A method for making an optical interconnect unit as claimed in claim 7 wherein the step of injecting a material onto both the surface and the optical fiber includes forming an alignment guide.

11. A method for making an optical interconnect unit as claimed in claim 7 wherein the step of positioning of the electrically conductive member adjacent to the at least one of the plurality of optical fibers, the electrically conductive member is a lead frame.

12. A method for making an optical interconnect unit comprising the steps of:

providing a mold with a first portion and a second portion, the first portion of the mold having a surface with a plurality of grooves on the surface;

placing a plurality of optical fibers in the plurality of grooves on the surface of the first portion;

positioning a plurality of conductive members adjacent to the plurality of optical fibers;

mating the second portion of the mold with the first portion of the mold forming a cavity between the surface of the first portion and the second portion, the cavity enclosing the plurality of optical fibers placed in the plurality of grooves between the first and the second mold portions;

injecting a material into the cavity so as to bind the injected material to the plurality of optical fibers, thereby forming a molded portion;

removing the molded portion from the mold;

placing the molded portion into a second mold having a first portion and a second portion;

mating the first portion of the second mold with the second portion of the second mold forming a cavity between the first and the second portion of the second mold at least a portion of the molded portion being in the cavity of the second mold; and injecting a material into the cavity so as to bind the material to the molded portion, thereby forming an optical interconnect unit.

13. A method for making an optical interconnect unit as claimed in claim 12 wherein the plurality of conductive members are a lead frame.

14. A method for making an optical interconnect unit as claimed in claim 12 wherein the step of injecting a material in the cavity, the material is a molding compound.

15. A method for making an optical interconnect unit as claimed in claim 14 wherein the step of injecting a material into the cavity, the material is selected from a group comprising: polyimides, polymers, and epoxies.

16. A molded portion with an optical fiber and an electrically conductive member comprising:

a first molded portion having an optical fiber molded thereto; and an electrically conductive member molded and positioned in the first molded portion adjacent to the optical fiber, wherein a portion of the electrically conductive member is substantially parallel to the optical fiber.

17. A molded portion with an optical fiber and conductive member as claimed in claim 16 further including an alignment guide molded in the first molded portion.

18. A molded portion with an optical fiber and conductive member as claimed in claim 16 wherein the electrically conductive member is a portion of a leadframe.

* * * * *